US011203914B2

(12) United States Patent
Davies et al.

(10) Patent No.: US 11,203,914 B2
(45) Date of Patent: Dec. 21, 2021

(54) 3D PRINTED BALL VALVE

(71) Applicant: Halliburton Energy Services, Inc., Houston, TX (US)

(72) Inventors: Katherine Ann Davies, Singapore (SG); Jeremy Wee Kiang Lau, Singapore (SG)

(73) Assignee: Halliburton Energy Services, Inc., Houston, TX (US)

(*) Notice: Subject to any disclaimer, the term of this patent is extended or adjusted under 35 U.S.C. 154(b) by 351 days.

(21) Appl. No.: 16/325,295

(22) PCT Filed: Sep. 27, 2016

(86) PCT No.: PCT/US2016/053981
§ 371 (c)(1),
(2) Date: Feb. 13, 2019

(87) PCT Pub. No.: WO2018/063161
PCT Pub. Date: Apr. 5, 2018

(65) Prior Publication Data
US 2019/0211648 A1  Jul. 11, 2019

(51) Int. Cl.
*E21B 34/06* (2006.01)
*F16K 5/06* (2006.01)
*B33Y 80/00* (2015.01)

(52) U.S. Cl.
CPC .............. *E21B 34/06* (2013.01); *B33Y 80/00* (2014.12); *F16K 5/0605* (2013.01); *F16K 5/0657* (2013.01); *E21B 2200/04* (2020.05)

(58) Field of Classification Search
CPC .............. E21B 31/06; E21B 2034/002; E21B 2200/04; B33Y 80/00; F16K 5/0605; F16K 5/0657
See application file for complete search history.

(56) References Cited

U.S. PATENT DOCUMENTS 3,484,079 A * 12/1969 Reagan ................. F16K 5/0642
251/309
3,518,742 A * 7/1970 Merrill et al. ........ B23P 15/001
29/890.125
(Continued)

FOREIGN PATENT DOCUMENTS

CN    2184124 Y    11/1994
JP    11-148567 A    6/1999
(Continued)

OTHER PUBLICATIONS

International Search Report and the Written Opinion of the International Search Authority, or the Declaration, dated May 10, 2017, PCT/US2016/053981, 12 pages, ISA/KR.

*Primary Examiner* — Daniel P Stephenson
(74) *Attorney, Agent, or Firm* — Haynes and Boone, LLP (57) ABSTRACT

A ball valve that includes a ball comprising an integrally formed single-component body that defines an external surface; a fluid passage extending through the body, the fluid passage defining an internal surface; and a plurality of internal chambers formed within the body, each internal chamber of the plurality of internal chambers being spaced from the external surface and being spaced from the internal surface; wherein when the ball is subjected to one or more stresses, a stress concentration is created within a release-by-milling zone of the single-component body, the release-by-milling zone being adjacent to the plurality of internal chambers. The ball is at least partially manufactured using an additive manufacturing process.

20 Claims, 6 Drawing Sheets

(56) References Cited

U.S. PATENT DOCUMENTS

| | | | | |
|---|---|---|---|---|
| 4,212,321 | A | * | 7/1980 | Hulsey .................. F16K 5/0605 |
| | | | | 137/625.32 |
| 5,127,628 | A | | 7/1992 | Kemp |
| 5,236,176 | A | * | 8/1993 | Yeh ........................... F16K 5/06 |
| | | | | 251/315.16 |
| 5,988,590 | A | | 11/1999 | Shiokawa |
| 6,471,183 | B2 | * | 10/2002 | Roszkowski ......... F16K 5/0605 |
| | | | | 251/315.16 |
| 10,837,562 | B2 | * | 11/2020 | Gottlieb ................. B33Y 80/00 |
| 2011/0198526 | A1 | | 8/2011 | Tappe |
| 2016/0003004 | A1 | * | 1/2016 | Inglis ..................... E21B 34/14 |
| | | | | 166/373 |
| 2019/0211648 | A1 | * | 7/2019 | Davies .................. F16K 5/0657 |

FOREIGN PATENT DOCUMENTS

| | | | | | |
|---|---|---|---|---|---|
| JP | | 3093176 U | * | 4/2003 | ............. A63B 53/04 |
| WO | WO 2014/130052 A1 | | | 8/2014 | |
| WO | WO-2019045977 A1 | * | | 3/2019 | ............. B33Y 80/00 |

* cited by examiner

3D PRINTED BALL VALVE

PRIORITY

The present application is a U.S. National Stage patent application of International Patent Application No. PCT/US2016/053981, filed on Sep. 27, 2016, the benefit of which is claimed and the disclosure of which is incorporated herein by reference in its entirety.

TECHNICAL FIELD

The present disclosure relates generally to subsurface equipment that is at least partially manufactured using additive manufacturing, such as 3D printing, and more specifically, to a printed ball valve.

BACKGROUND

A ball valve is a type of valve that uses a spherical ball as a closure mechanism. The ball has a bore extending through the body. The bore is aligned with the direction of flow when the valve is open and misaligned with the direction of flow when the valve is closed. Ball valves have many applications in well tools for use downhole in a wellbore, for example, as formation tester valves, safety valves, and in other downhole applications. Many of these well tool applications use a ball valve because ball valves can have a large through bore for passage of tools, tubing strings, and flow, yet also be compactly arranged, for example, having a cylindrical outer profile that corresponds to the cylindrical outer profile of the remainder of the string carrying the ball valve into the well bore and presenting few or no protrusions to hang up on the interior of the well. However, it is often necessary to mill out the ball valve if the ball valve becomes stuck in a closed or partially closed position. As the material of the ball is generally required to be strong, milling a ball within the ball valve can be time consuming.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

DETAILED DESCRIPTION

Illustrative embodiments and related methods of the present disclosure are described below as they might be employed in a printed ball valve and method of operating the same. In the interest of clarity, not all features of an actual implementation or method are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

The foregoing disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper," "uphole," "downhole," "upstream," "downstream," and the like, may be used herein for ease of description to describe one element or feature's relationship to another element(s) or feature(s) as illustrated in the figures. The spatially relative terms are intended to encompass different orientations of the apparatus in use or operation in addition to the orientation depicted in the figures. For example, if the apparatus in the figures is turned over, elements described as being "below" or "beneath" other elements or features would then be oriented "above" the other elements or features. Thus, the exemplary term "below" may encompass both an orientation of above and below. The apparatus may be otherwise oriented (rotated 90 degrees or at other orientations) and the spatially relative descriptors used herein may likewise be interpreted accordingly.

Figure 1:
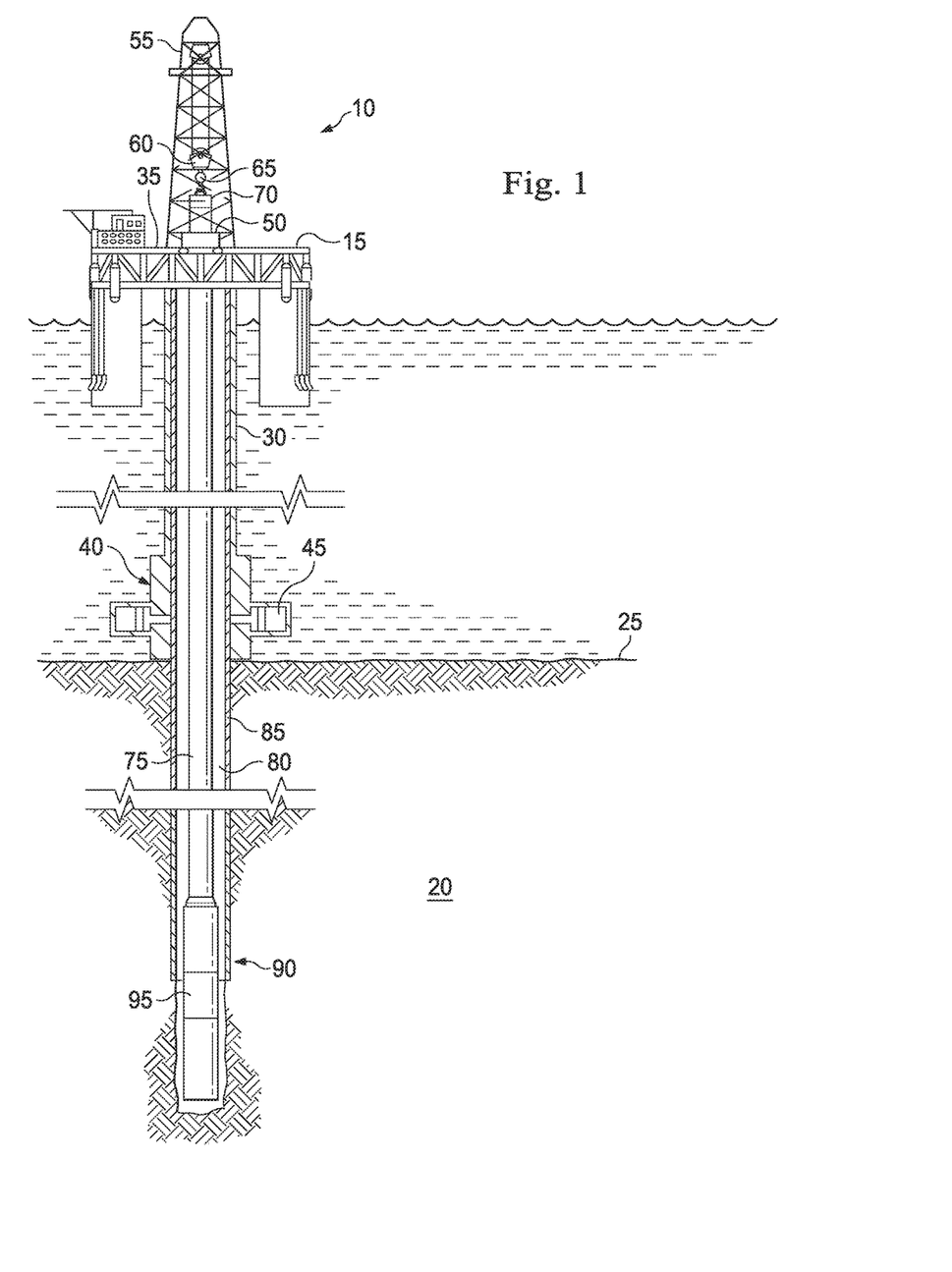
FIG. 1 is a schematic illustration of an offshore oil or gas production platform operating a printed ball valve, according to an exemplary embodiment of the present disclosure.

FIG. 1 is a schematic illustration of an offshore oil and gas platform generally designated 10, operably coupled by way of example to a printed ball valve according to the present disclosure. Such an assembly could alternatively be coupled to a semi-sub or a drill ship as well. Also, even though FIG. 1 depicts an offshore operation, it should be understood by those skilled in the art that the apparatus according to the present disclosure is equally well suited for use in onshore operations. By way of convention in the following discussion, though FIG. 1 depicts a vertical wellbore, it should be understood by those skilled in the art that the apparatus according to the present disclosure is equally well suited for use in wellbores having other orientations including horizontal wellbores, slanted wellbores, multilateral wellbores or the like.

Referring still to the offshore oil and gas platform example of FIG. 1, a semi-submersible platform 15 may be positioned over a submerged oil and gas formation 20 located below a sea floor 25. A subsea conduit 30 may extend from a deck 35 of the platform 15 to a subsea wellhead installation 40, including blowout preventers 45. The platform 15 may have a hoisting apparatus 50, a derrick 55, a travel block 60, a hook 65, and a swivel 70 for raising and lowering pipe strings, such as a substantially tubular, axially extending tubing string 75. As in the present example embodiment of FIG. 1, a wellbore 80 extends through the various earth strata including the formation 20, with a portion of the wellbore 80 having a casing string 85 cemented therein. Disposed in the wellbore 80 is a completion assembly 90. Generally, the assembly 90 may be any one or more completion assemblies, such as for example a hydraulic fracturing assembly, a gravel packing assembly, etc. The assembly 90 may be coupled to the tubing string 75 and may include the printed ball valve 95 (shown in greater detail in FIGS. 2A and 2B). However, the valve 95 is not limited to a completion assembly 90 and may instead be included in a production assembly or other assembly.

Figure 2A:
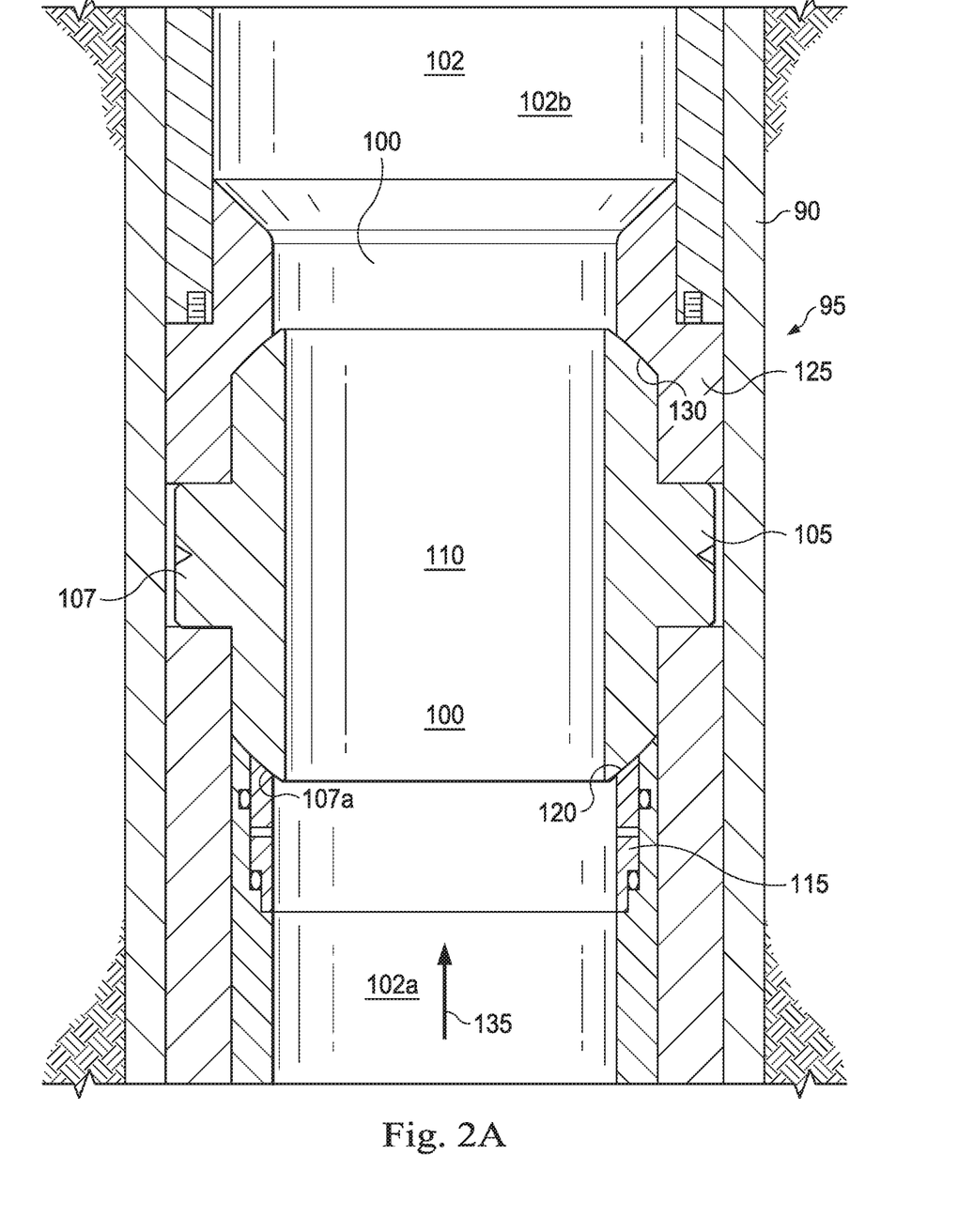
FIG. 2A is a sectional view of the ball valve of FIG. 1 in an open position, the ball valve having a ball according to an exemplary embodiment of the present disclosure.
Figure 2B:
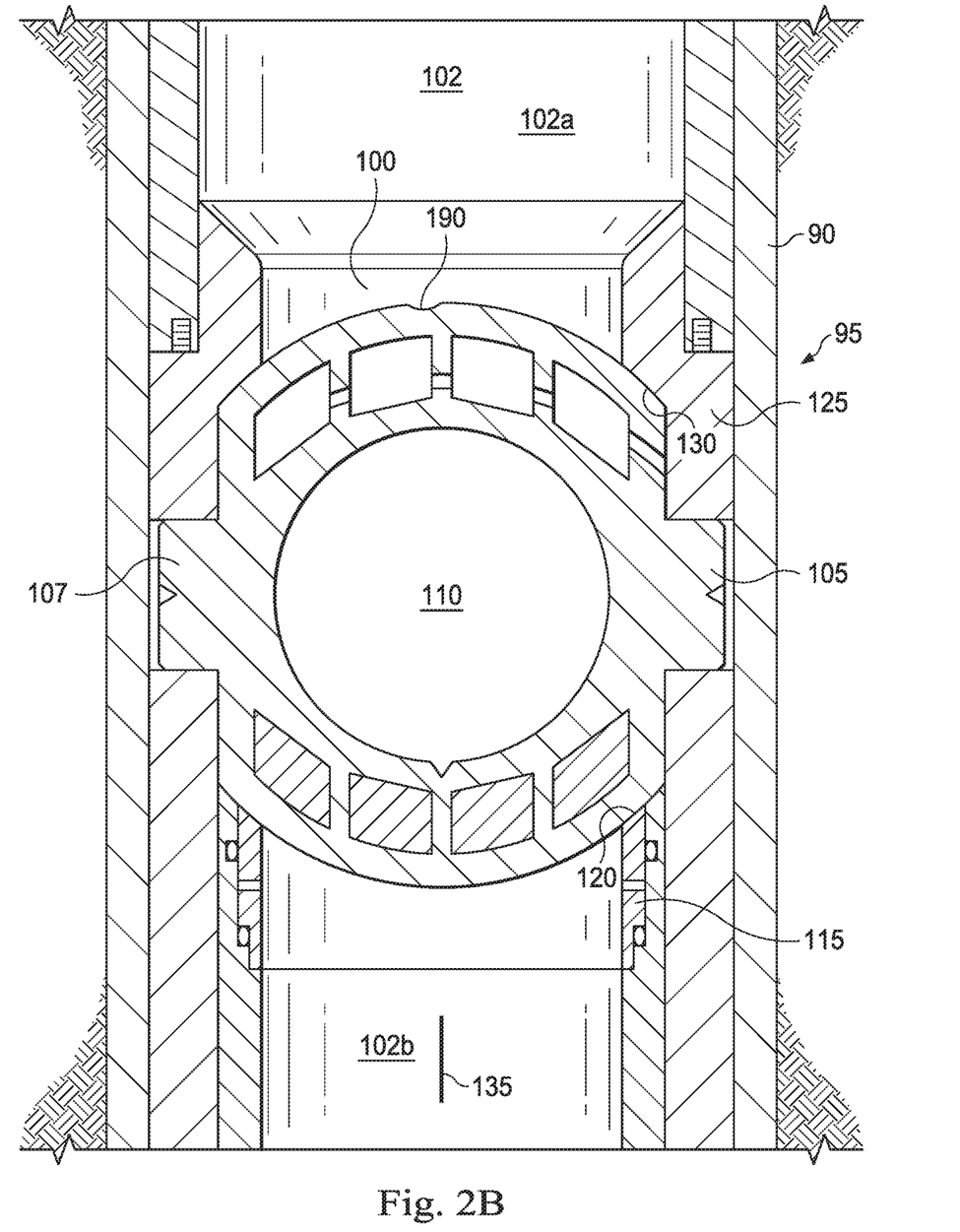
FIG. 2B is a sectional view of the ball valve of FIG. 2A in a closed position, according to an exemplary embodiment of the present disclosure.

FIGS. 2A and 2B are sectional views of the printed ball valve 95. The ball valve 95 has a cylindrical central flow bore 100 that runs axially through the valve 95. The central flow bore 100 is adapted to align with and communicate fluid with a central flow bore 102 of the remainder of the string 75. The ball valve 95 has a substantially spherical ball 105 formed from an integrally formed single-component ball body 107 having an external surface 107a. the body 107 also has a cylindrical fluid passage 110 extending through the body 107. The valve 95 also includes a first seat member 115 that has a first seat face 120 that forms a seal with the external surface 107a of the body 107. The valve 95 may also include a second seat member 125 that has a second seat face 130 that forms a seal with the external surface 107a of the body 107. When the valve 95 is open and as shown in FIG. 2A, the passage 110 is a part of the central flow bore 100, and a longitudinal axis of the passage 110 is longitudinally aligned with and communicates fluids with the remainder of the central flow bore 102. As shown in FIG. 2B and when the valve 95 is in a closed position, the longitudinal axis of the passage 110 is generally perpendicular to longitudinal axes of the flow bores 100 and 102 such that a portion of the body 107 of the ball 105 seals a first portion of the bore 102a from a second portion of the bore 102b so that a fluid is prevented or at least discouraged from passing in the direction depicted by the numeral 135 in FIGS. 2A and 2B.

Figure 3:
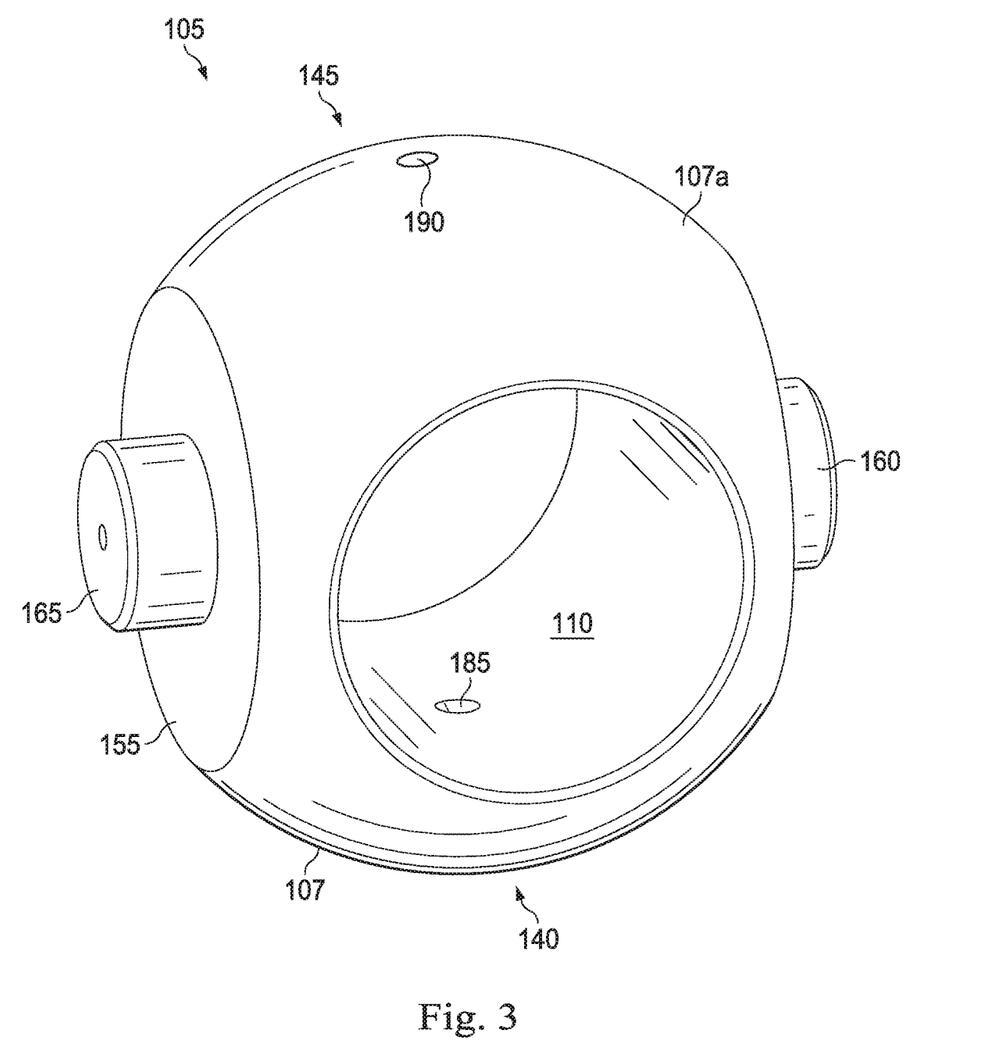
FIG. 3 is a perspective view of the ball of FIG. 2A, according to an exemplary embodiment of the present disclosure.
Figure 4:
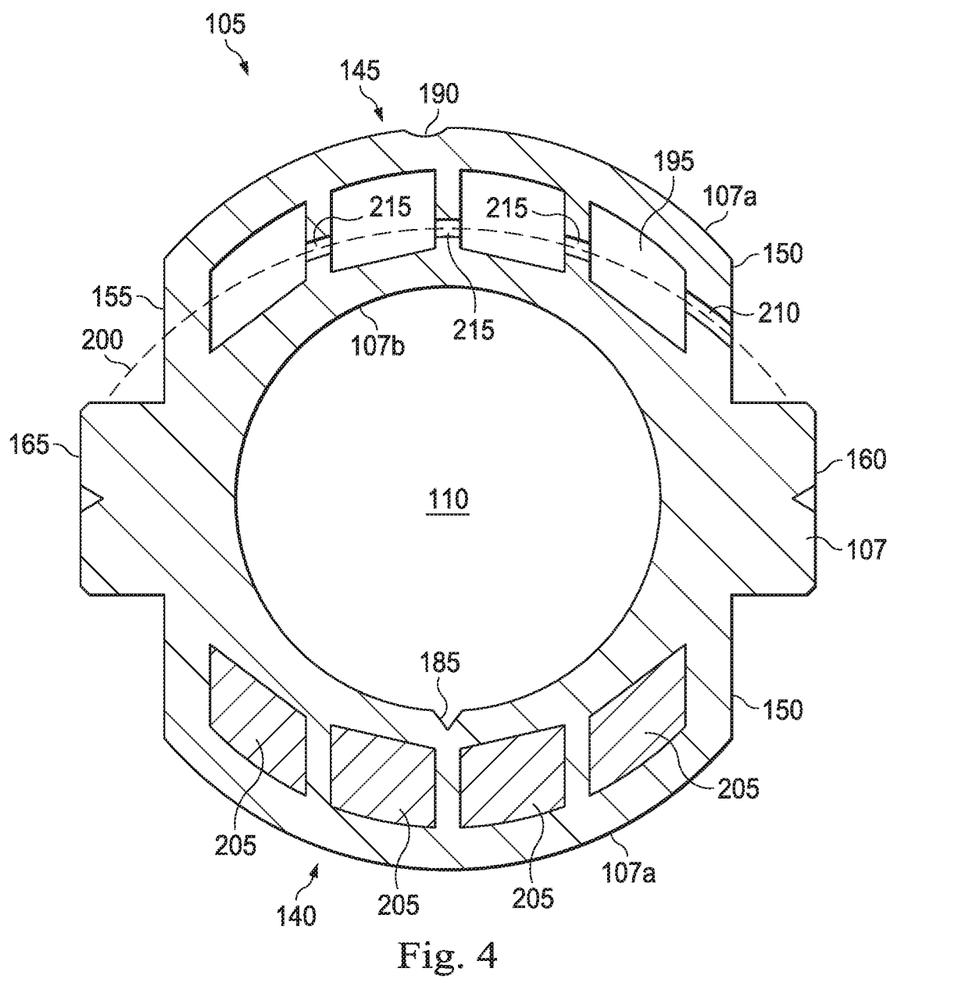
FIG. 4 is a sectional view of the ball of FIG. 2A, according to another exemplary embodiment of the present disclosure.

FIG. 3 illustrates a perspective view of the ball 105 and FIG. 4 illustrates a sectional view of the ball 105. Referring to FIGS. 3 and 4, the body 107 forms a bottom portion 140 and an opposing top portion 145. The fluid passage 110 separates or extends between the bottom portion 140 and the opposing top portion 145. The ball 105 also generally includes opposing planar surfaces 150 and 155. The fluid passage 110 also separates or extends between the opposing planar surfaces 150 and 155. The opposing planar surfaces 150 and 155 also separate or extend between the bottom portion 140 and the opposing top portion 145. Each of the planar surfaces 150 and 155 have a cylindrical projection 160 and 165, respectively, extending outwardly therefrom. The projections 160 and 165 are aligned within the valve 95 to secure the ball 105 from movement in the longitudinal direction relative to the string 75 (including the direction depicted by the numeral 135 in FIG. 2A) while allowing for the ball 105 to rotate about the projections 160 and 165. The ball 105 may be rotated between the open and closed positions in a variety of ways, which will not be discussed here. In some embodiments, the passage 110 defines an interior surface 107b of the body, which may form a dimple 185. The dimple 185 may extend within the bottom portion 140 of the ball 105 and towards the external surface 107a of the bottom portion 140. The dimple 185 may be any shape, such as a cone, a portion of a sphere, a cylinder, etc. Additionally, the external surface 107a of the top portion 145 may form a dimple 190 that extends towards the passage 110 or generally inwardly. However, the external surface 107a of the top portion 145 may form any type of textured surface or may be a smooth spherical surface.

Additionally, a plurality of chambers 195 may be formed within the body 107. In one or more exemplary embodiments, at least one chamber within the plurality of chambers 135 is an internal chamber. In one or more exemplary embodiments, an internal chamber is a chamber that is spaced from the external surface 107a and the internal surface 107b. Additionally, an internal chamber may be a chamber that does not penetrate the external surface 107a and/or the internal surface 107b. In one or more exemplary embodiments, the chambers from the plurality of chambers 195 are radially spaced and/or axially spaced throughout the top portion 145 of the body 107. However, the plurality of chambers 195 may be radially spaced and/or axially spaced throughout the bottom portion 140 of the body 107 or anywhere within the body 107. In one or more exemplary embodiments, the spacing of chambers of the plurality of chambers 195 in the radial and axial directions forms a chamber array. In one or more exemplary embodiments, each chamber of the plurality of chambers 195 may be one of a variety of shapes, such as a spherical, a cone, a pyramid, a cube, a cylinder, an undefined shape, etc. In one or more exemplary embodiments, the chambers from the plurality of chambers 195 may be spaced in a variety of arrays to form an integrally formed single-component ball 105 of a ball valve 95. In an exemplary embodiment, the plurality of chambers 195 form a release-by-milling zone 200. In an exemplary embodiment, the zone 200 may extend or form a geometric shape, such as a line, a plane, an arc, a cylinder, a section of a cylinder, etc. However, the zone 200 may also extend over or form an undefined volume or general region. As shown in FIG. 4, the plurality of chambers 195 creates a release-by-milling zone generally within the top portion 145 of the body 107 such that when the ball valve 95 is milled and therefore subjected to stress (i.e., shear stress, compressive stress, or tensile stress), the top portion 145 breaks away and is milled out easily. Thus, it is easy to mill out the ball 105 of the ball valve 95. While the plurality of internal chambers 195 does not reduce or affect the performance of the ball valve 95, it does result in weaker resistance during milling operations. Specifically, the strength of the ball 105 is not changed when subjected to pressures in the direction depicted by the numeral 135 on FIGS. 2A and 2B, yet the speed of milling operations is increased and/or effort of milling operations is decreased. In one or more exemplary embodiments, the density of the chambers 195 may be uniform or gradient. In one or more exemplary embodiments, each of the chambers in the plurality of chambers 195 is of engineered size distribution and chamber density distribution. In one or more exemplary embodiments, the plurality of chambers 195 is pre-determined by numerical analysis and does not detract from mechanical strength performance of the ball valve 95 when the ball valve 95 is operating normally. In an exemplary embodiment, the body 107 is a fused body formed from a fused material and the chambers from the plurality of chambers 195 are un-fused areas. In an exemplary embodiment, the chambers from the plurality of chambers 195 contain an un-fused material (they are not completely hollow). Generally, the body 107 of the ball 105 is a metal material. Generally, the body 107 is a single metal material, however, the body 107 may be comprised of any single material that is a metal or a non-metal. In an exemplary embodiment, a material 205 is accommodated within at least one chamber of the plurality of chambers 195, with the material 205 being different than the material of the body 107. For example, the body 107 of the ball 105 may be a first metal and the material 205 may be a second metal that is weaker, and thus different, than the first metal. In an exemplary embodiment, the second metal has a hardness (as determined by the Brinell test, Vickers hardness test, or other) that is less than a hardness (as determined by the Brinell test, Vickers hardness test, or other) of the first metal. For example, the first metal may be a stainless steel and the second metal may be a different steel alloy or aluminum. In an exemplary embodiment, the second material may be a material having a lower yield strength than the first material. Regardless, any metal or non-metal may be the material 205.

Additionally, a vent 210 may be formed within the body 107 and extend from the external surface 107a or the internal surface 107b to at least one of the chambers in the plurality of chambers 195. As shown in FIG. 4, the vent 200 extends from the external surface of the planar surface 150. Also, an interior passageway 215 may extend from one chamber to another chamber to place the chambers in communication.

Exemplary embodiments of the present disclosure may be altered in a variety of ways. For example, the plurality of chambers 195 may be omitted from the bottom portion 145 of the body 107. Additionally, the vent 210 may be omitted or the material 205 may be omitted from the ball 105. Moreover, the plurality of chambers 195 may form a variety of structures within the body 107. For example, the plurality of chambers 195 may be sized and spaced such that a honeycomb structure, a lattice structure, or the like is formed within the body 107.

In operation, the valve 95 is extended downhole and exposed to downhole pressures. When the material 205 is accommodated within at least one chamber of the plurality of chambers 195, the material 205 prevents or at least discourages an atmospheric trap from forming within the body 107 but is a softer material than the material of the body 107. Thus the material 205 is easily millable. Similarly, when the body 107 forms the vent 210 and when the body 107 is exposed to downhole pressures, the vent 210 prevents or at least discourages an atmospheric trap from forming within the body 107. Any number of vents 210 may be formed within the body 107 to vent each chamber of the plurality of chambers 195. Alternatively, the interior passageway 215 allows a first chamber to vent into a second chamber that is in communication with the vent 210 thereby reducing the number of vents 210. When in the closed position, the external surface 107a of the body 107 is seated against the first seat face 120 such that the lower portion 140 extends across the central flow bore 100 to seal the first portion of the bore 102a from the second portion of the bore 102b. When the ball valve 95 is in the closed position and milled by a milling tool, the milling tool extends in a direction opposite to the direction depicted by the numeral 135 in FIGS. 2A and 2B. Additionally and when the plurality of chambers 195 is located within the top portion 145 to create a release-by-milling zone 200 in the top portion 145, the time or effort of the milling operation is reduced, as the body 107 breaks apart along the release-by-milling zone 200. Once the milling tool has extended through the top portion 145, the dimple 185 guides the milling tool towards the lower portion 140 to aid in the milling process. Thus, the dimple 185 is a centralizing point for the milling tool.

Figure 5:
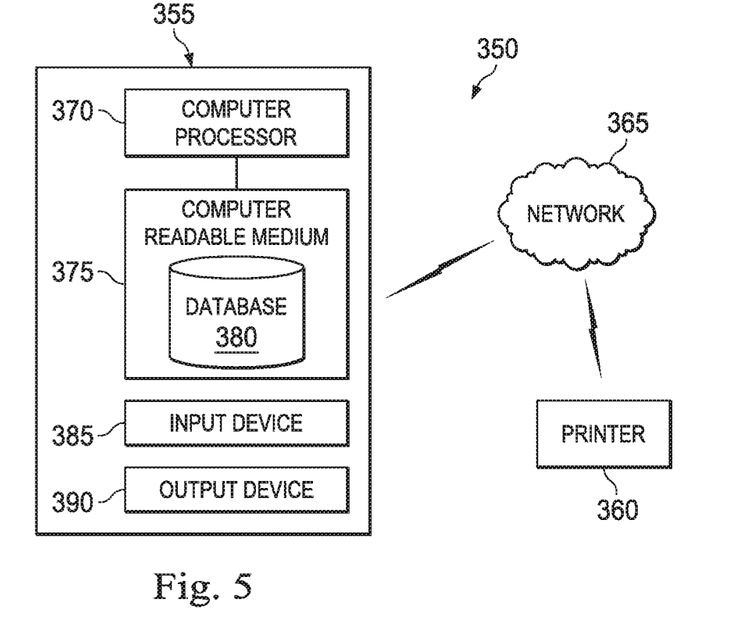
FIG. 5 illustrates an additive manufacturing system, according to an exemplary embodiment.

In an exemplary embodiment and as shown in FIG. 5, a down-hole tool printing system 350 includes one or more computers 355 and a printer 360 that are operably coupled together, and in communication via a network 365. In one or more exemplary embodiments, the tool 95 may be manufactured using the downhole tool printing system 350. In one or more exemplary embodiments, the one or more computers 355 include a computer processor 370 and a computer readable medium 375 operably coupled thereto. In one or more exemplary embodiments, the computer processor 370 includes one or more processors. Instructions accessible to, and executable by, the computer processor 370 are stored on the computer readable medium 375. A database 380 is also stored in the computer readable medium 375. In one or more exemplary embodiments, the computer 355 also includes an input device 385 and an output device 390. In one or more exemplary embodiments, web browser software is stored in the computer readable medium 375. In one or more exemplary embodiments, three dimensional modeling software is stored in the computer readable medium. In one or more exemplary embodiments, software that includes advanced numerical methods for topology optimization, which assists in determining optimum chamber shape, chamber size distribution, and chamber density distribution or other topological features in the tool 95, is stored in the computer readable medium. In one or more exemplary embodiments, software involving finite element analysis and topology optimization is stored in the computer readable medium 375. In one or more exemplary embodiments, any one or more constraints are entered in the input device 385 such that the software aids in the design on a tool 95 in which specific portions of the body of the tool 95 remain solid (i.e., no chambers are formed). In one or more exemplary embodiments, the input device 385 is a keyboard, mouse, or other device coupled to the computer 355 that sends instructions to the computer 355. In one or more exemplary embodiments, the input device 385 and the output device 390 include a graphical display, which, in several exemplary embodiments, is in the form of, or includes, one or more digital displays, one or more liquid crystal displays, one or more cathode ray tube monitors, and/or any combination thereof. In one or more exemplary embodiments, the output device 390 includes a graphical display, a printer, a plotter, and/or any combination thereof. In one or more exemplary embodiments, the input device 385 is the output device 390, and the output device 390 is the input device 385. In several exemplary embodiments, the computer 355 is a thin client. In several exemplary embodiments, the computer 355 is a thick client. In several exemplary embodiments, the computer 355 functions as both a thin client and a thick client. In several exemplary embodiments, the computer 355 is, or includes, a telephone, a personal computer, a personal digital assistant, a cellular telephone, other types of telecommunications devices, other types of computing devices, and/or any combination thereof. In one or more exemplary embodiments, the computer 355 is capable of running or executing an application. In one or more exemplary embodiments, the application is an application server, which in several exemplary embodiments includes and/or executes one or more web-based programs, Intranet-based programs, and/or any combination thereof. In one or more exemplary embodiments, the application includes a computer program including a plurality of instructions, data, and/or any combination thereof. In one or more exemplary embodiments, the application written in, for example, HyperText Markup Language (HTML), Cascading Style Sheets (CSS), JavaScript, Extensible Markup Language (XML), asynchronous JavaScript and XML (Ajax), and/or any combination thereof.

In one or more exemplary embodiments, the printer 360 is a three-dimensional printer. In one or more exemplary embodiments, the printer 360 includes a layer deposition mechanism for depositing material in successive adjacent layers; and a bonding mechanism for selectively bonding one or more materials deposited in each layer. In one or more exemplary embodiments, the printer 360 is arranged to form a unitary printed body by depositing and selectively bonding a plurality of layers of material one on top of the other. In one or more exemplary embodiments, the printer 360 is arranged to deposit and selectively bond two or more different materials in each layer, and wherein the bonding mechanism includes a first device for bonding a first material in each layer and a second device, different from the first device, for bonding a second material in each layer. In one or more exemplary embodiments, the first device is an ink jet printer for selectively applying a solvent, activator or adhesive onto a deposited layer of material. In one or more exemplary embodiments, the second device is a laser for selectively sintering material in a deposited layer of material. In one or more exemplary embodiments, the layer deposition means includes a device for selectively depositing at least the first and second materials in each layer. In one or more exemplary embodiments, any one of the two or more different materials may be ABS plastic, PLA, polyamide, glass filled polyamide, sterolithography materials, silver, titanium, steel, wax, photopolymers, polycarbonate, and a variety of other materials. In one or more exemplary embodiments, the printer 360 may involve fused deposition modeling, selective laser sintering, and/or multi-jet modeling. In operation, the computer processor 370 executes a plurality of instructions stored on the computer readable medium 375. As a result, the computer 355 communicates with the printer 360, causing the printer 360 to manufacture the tool 95 or at least a portion thereof, such as the ball 105. In one or more exemplary embodiments, manufacturing the ball 105 using the system 350 results in an integrally formed ball 105.

Figure 6:
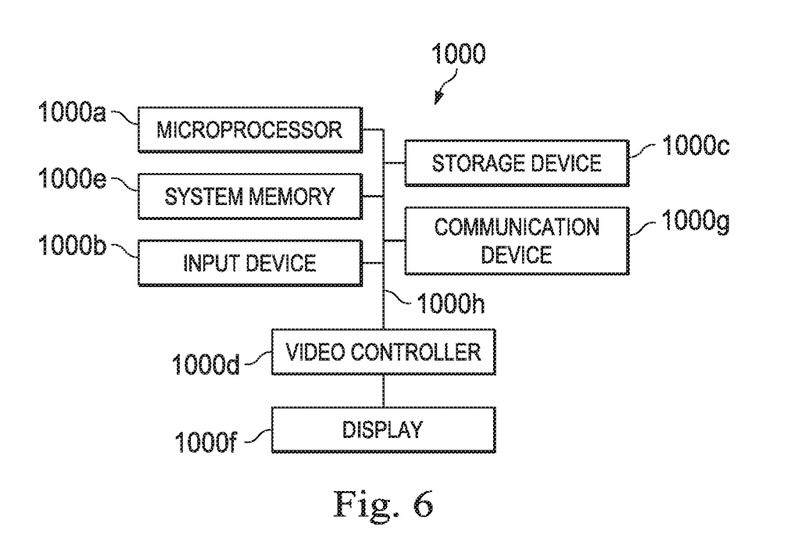
FIG. 6 is a diagrammatic illustration of a node for implementing one or more exemplary embodiments of the present disclosure, according to an exemplary embodiment.

In one or more exemplary embodiments, as illustrated in FIG. 6 with continuing reference to FIGS. 1, 2A, 2B, and 3-5, an illustrative computing device 1000 for implementing one or more embodiments of one or more of the above-described networks, elements, methods and/or steps, and/or any combination thereof, is depicted. The computing device 1000 includes a processor 1000a, an input device 1000b, a storage device 1000c, a video controller 1000d, a system memory 1000e, a display 1000f, and a communication device 1000g, all of which are interconnected by one or more buses 1000h. In several exemplary embodiments, the storage device 1000c may include a floppy drive, hard drive, CD-ROM, optical drive, any other form of storage device and/or any combination thereof. In several exemplary embodiments, the storage device 1000c may include, and/or be capable of receiving, a floppy disk, CD-ROM, DVD-ROM, or any other form of computer readable medium that may contain executable instructions. In one or more exemplary embodiments, the computer readable medium is a non-transitory tangible media. In several exemplary embodiments, the communication device 1000g may include a modem, network card, or any other device to enable the computing device 1000 to communicate with other computing devices. In several exemplary embodiments, any computing device represents a plurality of interconnected (whether by intranet or Internet) computer systems, including without limitation, personal computers, mainframes, PDAs, smartphones and cell phones.

In several exemplary embodiments, the one or more computers 355, the printer 360, and/or one or more components thereof, are, or at least include, the computing device 1000 and/or components thereof, and/or one or more computing devices that are substantially similar to the computing device 1000 and/or components thereof. In several exemplary embodiments, one or more of the above-described components of one or more of the computing device 1000, one or more computers 355, and the printer 360 and/or one or more components thereof, include respective pluralities of same components.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a computing device such as, for example, on a client machine or server.

In several exemplary embodiments, combinations of software and hardware could also be used for providing enhanced functionality and performance for certain embodiments of the present disclosure. In one or more exemplary embodiments, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In one or more exemplary embodiments, a data structure may provide an organization of data, or an organization of executable code.

In several exemplary embodiments, the network 365, and/or one or more portions thereof, may be designed to work on any specific architecture. In one or more exemplary embodiments, one or more portions of the network 365 may be executed on a single computer, local area networks, client-server networks, wide area networks, internets, hand-held and other portable and wireless devices and networks.

In several exemplary embodiments, a database may be any standard or proprietary database software, such as Oracle, Microsoft Access, SyBase, or DBase II, for example.

In several exemplary embodiments, the database may have fields, records, data, and other database elements that may be associated through database specific software. In several exemplary embodiments, data may be mapped. In several exemplary embodiments, mapping is the process of associating one data entry with another data entry. In one or more exemplary embodiments, the data contained in the location of a character file can be mapped to a field in a second table. In several exemplary embodiments, the physical location of the database is not limiting, and the database may be distributed. In one or more exemplary embodiments, the database may exist remotely from the server, and run on a separate platform. In one or more exemplary embodiments, the database may be accessible across the Internet. In several exemplary embodiments, more than one database may be implemented.

In several exemplary embodiments, a computer program, such as a plurality of instructions stored on a computer readable medium, such as the computer readable medium 375, the system memory 1000e, and/or any combination thereof, may be executed by a processor to cause the processor to carry out or implement in whole or in part the operation of the system 350, and/or any combination thereof. In several exemplary embodiments, such a processor may include one or more of the computer processor 370, the processor 1000a, and/or any combination thereof. In several exemplary embodiments, such a processor may execute the plurality of instructions in connection with a virtual computer system.

In several exemplary embodiments, a plurality of instructions stored on a computer readable medium may be executed by one or more processors to cause the one or more processors to carry out or implement in whole or in part the above-described operation of each of the above-described exemplary embodiments of the system, the method, and/or any combination thereof. In several exemplary embodiments, such a processor may include one or more of the microprocessor 1000a, any processor(s) that are part of the components of the system, and/or any combination thereof, and such a computer readable medium may be distributed among one or more components of the system. In several exemplary embodiments, such a processor may execute the plurality of instructions in connection with a virtual computer system. In several exemplary embodiments, such a plurality of instructions may communicate directly with the one or more processors, and/or may interact with one or more operating systems, middleware, firmware, other applications, and/or any combination thereof, to cause the one or more processors to execute the instructions.

In one or more exemplary embodiments, the instructions may be generated, using in part, advanced numerical method for topology optimization to determine optimum chamber shape, chamber size and distribution, and chamber density distribution for the plurality of chambers 195, or other topological features.

During operation of the system 350, the computer processor 370 executes the plurality of instructions that causes the manufacture of the tool 95 using additive manufacturing. Thus, the tool 95 is at least partially manufactured using an additive manufacturing process. Manufacturing the tool 95 via machining forged billet stock or using multi-axis milling processes often limits the geometries and design of the tool 95. Thus, with additive manufacturing, complex geometries—such as internal chambers 195—are achieved or allowed, which results in the creation of a release-by-milling zone 200 within the tool 95. In one or more exemplary embodiments, the use of three-dimensional, or additive, manufacturing to manufacture downhole equipment, such as the tool 95, will allow increased flexibility in the strategic placement of material to retain strength in one direction but reduce strength, or weaken the tool in another direction.

Thus, a ball valve has been described. Embodiments of the ball valve may generally include a ball including an integrally formed single-component body that defines: an external surface; a fluid passage extending through the body, the fluid passage defining an internal surface; and a plurality of internal chambers formed within the body, each internal chamber of the plurality of internal chambers being spaced from the external surface and being spaced from the internal surface; wherein when the ball is subjected to one or more stresses, a stress concentration is created within a release-by-milling zone of the single-component body, the release-by-milling zone being adjacent to the plurality of internal chambers. Additionally, an apparatus has been described. Embodiments of the apparatus may generally include a non-transitory computer readable medium; and a plurality of instructions stored on the non-transitory computer readable medium and executable by one or more processors, the plurality of instructions including: instructions that cause the manufacture of a ball of a ball valve, the ball including an integrally formed single-component body that defines: an external surface; a fluid passage extending through the body, the fluid passage defining an internal surface; and a plurality of internal chambers formed within the body, each internal chamber of the plurality of internal chambers being spaced from the external surface and being spaced from the internal surface; wherein when the ball is subjected to one or more stresses, a stress concentration is created within a release-by-milling zone of the single-component body, the release-by-milling zone being adjacent to the plurality of internal chambers. Any of the foregoing embodiments may include any one of the following elements, alone or in combination with each other:

The plurality of chambers formed within the body form a lattice structure within the body.

The body includes a first material and a second material is accommodated within the one internal chamber of the plurality of internal chambers. 190

The first material is different from the second material.

Each internal chamber of the plurality of internal chambers is fluidically isolated from the internal surface and the external surface.

A vent extends from the external surface and to the one internal chamber of the plurality of internal chambers.

The body forms a first external planar surface and an opposing second external planar surface.

The vent extends from at least one of the first external planar surface and the second external planar surface.

The ball valve includes a ball seat.

The body forms a top portion and an opposing bottom portion.

The fluid passage extends between the top portion and the opposing bottom portion.

The bottom portion includes a spherical external surface that is adapted to contact the ball seat to form a seal.

A dimple is formed in the internal surface, the dimple extending towards the opposing bottom portion.

A passageway extends from the one internal chamber to another internal chamber of the plurality of internal chambers.

The plurality of chambers is located within the top portion such that the release-by-milling zone extends within the top portion.

The ball is at least partially manufactured using an additive manufacturing process.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures. In several exemplary embodiments, one or more of the operational steps in each embodiment may be omitted. Moreover, in some instances, some features of the present disclosure may be employed without a corresponding use of the other features. Although various embodiments and methods have been shown and described, the disclosure is not limited to such embodiments and methods and will be understood to include all modifications and variations as would be apparent to one skilled in the art. Therefore, it should be understood that the disclosure is not intended to be limited to the particular forms disclosed. Accordingly, the intention is to cover all modifications, equivalents and alternatives falling within the spirit and scope of the disclosure as defined by the appended claims. The foregoing description and figures are not drawn to scale, but rather are illustrated to describe various embodiments of the present disclosure in simplistic form.

What is claimed is:

1. A ball valve, comprising:
    a ball comprising an integrally formed single-component body that defines:
    an external surface;
    a fluid passage extending through the body, the fluid passage defining an internal surface; and
    a plurality of internal chambers formed within the body, each internal chamber of the plurality of internal chambers being spaced from the external surface and being spaced from the internal surface;
    wherein the body forms a first external planar surface and an opposing second external planar surface;
    wherein the body comprises a first projection extending from the first external planar surface and a second projection extending from the second external planar surface;
    wherein when the ball is subjected to one or more stresses, a stress concentration is created within a release-by-milling zone of the single-component body, the release-by-milling zone being adjacent to the plurality of internal chambers.

2. The ball valve of claim 1, wherein the plurality of chambers formed within the body form a lattice structure within the body.

3. The ball valve of claim 1,
    wherein each internal chamber of the plurality of internal chambers is fluidically isolated from the external surface;
    wherein the body comprises a first material;
    wherein a second material is accommodated within one internal chamber of the plurality of internal chambers; and
    wherein the first material is different from the second material.

4. The ball valve of claim 1, wherein a vent extends from the external surface and to one internal chamber of the plurality of internal chambers.

5. The ball valve of claim 4,
    wherein the body forms a first external planar surface and an opposing second external planar surface; and
    wherein the vent extends from at least one of the first external planar surface and the second external planar surface.

6. The ball valve of claim 4, wherein a passageway extends from the one internal chamber to another internal chamber of the plurality of internal chambers.

7. The ball valve of claim 1, further comprising a ball seat;
    wherein the body forms a top portion and an opposing bottom portion;
    wherein the fluid passage extends between the top portion and the opposing bottom portion;
    wherein the bottom portion comprises a spherical external surface that is adapted to contact the ball seat to form a seal; and
    wherein a dimple is formed in the internal surface, the dimple extending towards the opposing bottom portion.

8. The ball valve of claim 7, wherein the plurality of chambers is located within the top portion such that the release-by-milling zone extends within the top portion.

9. The ball valve of claim 1, wherein the ball is at least partially manufactured using an additive manufacturing process; and
    wherein the ball is formed of a single metal.

10. The ball valve of claim 1, wherein portions of the body proximate the first and second projections are solid in an entire thickness direction from the internal surface to the external surface.

11. An apparatus comprising:
    a non-transitory computer readable medium; and
    a plurality of instructions stored on the non-transitory computer readable medium and executable by one or more processors, the plurality of instructions comprising:
    instructions that cause the manufacture of a ball of a ball valve, the ball comprising an integrally formed single-component body that defines:
    an external surface;
    a fluid passage extending through the body, the fluid passage defining an internal surface; and
    a plurality of internal chambers formed within the body, each internal chamber of the plurality of internal chambers being spaced from the external surface and being spaced from the internal surface;
    wherein the body forms a first external planar surface and an opposing second external planar surface;
    wherein the body comprises a first projection extending from the first external planar surface and a second projection extending from the second external planar surface;
    wherein when the ball is subjected to one or more stresses, a stress concentration is created within a release-by-milling zone of the single-component body, the release-by-milling zone being adjacent to the plurality of internal chambers.

12. The apparatus of claim 11, wherein the plurality of chambers formed within the body form a lattice structure within the body.

13. The apparatus of claim 11,
    wherein each internal chamber of the plurality of internal chambers is fluidically isolated from the external surface;
    wherein the body comprises a first material;
    wherein a second material is accommodated within one internal chamber of the plurality of internal chambers; and
    wherein the first material is different from the second material.

14. The apparatus of claim 11, wherein a vent extends from the external surface and to one internal chamber of the plurality of internal chambers.

15. The apparatus of claim 14,
wherein the body forms a first external planar surface and an opposing second external planar surface; and
wherein the vent extends from at least one of the first external planar surface and the second external planar surface.

16. The apparatus of claim 14, wherein a passageway extends from the one internal chamber to another internal chamber of the plurality of internal chambers.

17. The apparatus of claim 11,
wherein the body forms a top portion and an opposing bottom portion;
wherein the fluid passage extends between the top portion and the opposing bottom portion;
wherein the bottom portion comprises a spherical external surface that is adapted to contact a ball seat to form a seal; and
wherein a dimple is formed in the internal surface, the dimple extending towards the opposing bottom portion.

18. The apparatus of claim 17, wherein the plurality of chambers is located within the top portion such that the release-by-milling zone extends within the top portion.

19. The apparatus of claim 11, wherein the ball is at least partially manufactured using an additive manufacturing process; and
wherein the ball is formed of a single metal.

20. The ball valve of claim 11, wherein portions of the body proximate the first and second projections are solid in an entire thickness direction from the internal surface to the external surface.

* * * * *